Patented Aug. 10, 1943

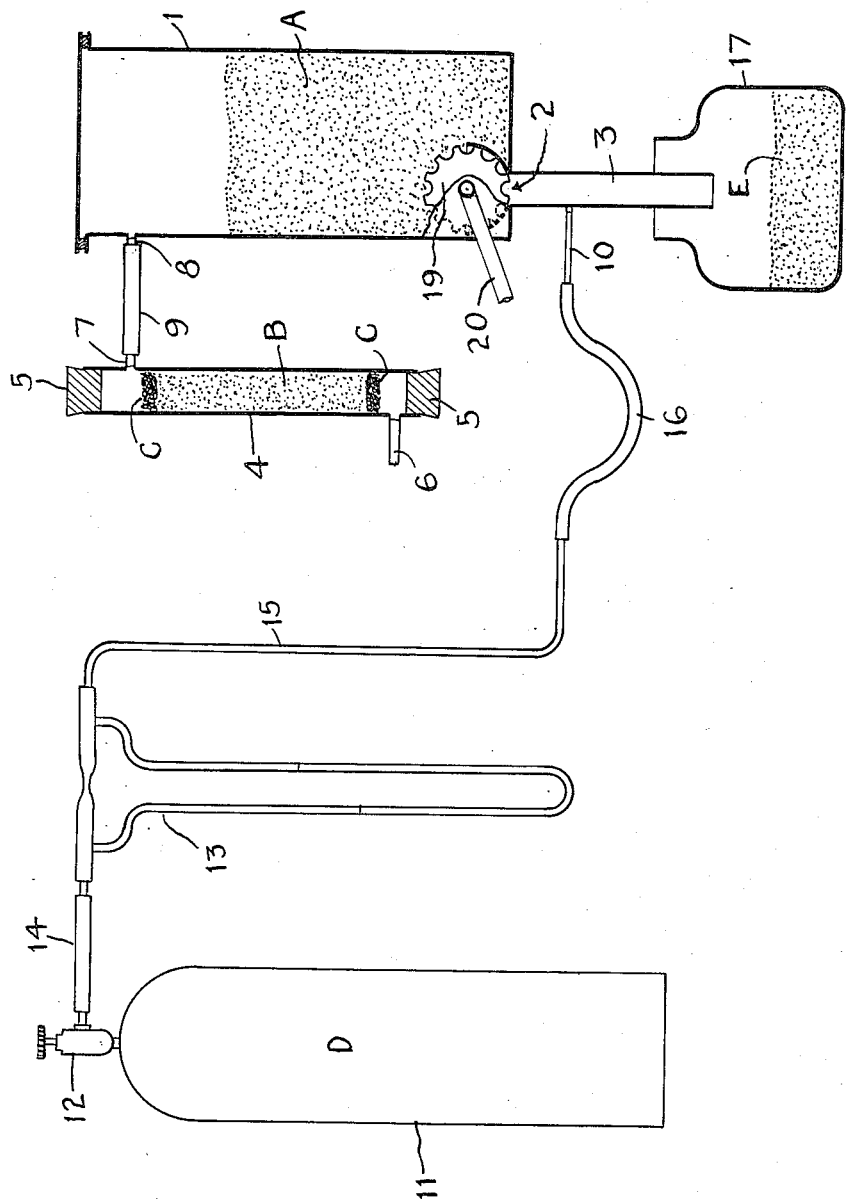

2,326,276

UNITED STATES PATENT OFFICE 2,326,276

METHOD AND APPARATUS FOR FEEDING HYGROSCOPIC AND REACTIVE MATERIALS

Souren Z. Avedikian, Baltimore, Md.

Application February 1, 1940, Serial No. 316,855

6 Claims. (Cl. 221—118)

This invention relates to improvements in method of and apparatus for feeding chemicals or other materials, in the solid state and of relatively small size, which are hygroscopic or reactive in nature, and especially these substances in finely pulverized form. This invention provides a means whereby the feeding of such materials is effected simply and easily. Present feeders of well-known and standard design may be used by attaching thereto certain devices described below.

Many mechanisms or feeders for delivering definite and predetermined quantities of materials are known. The principles on which they operate are well understood. They may all be grouped under two headings: mechanical and electrical. Under the former may be included those which depend upon moving parts to accomplish the feeding and upon regulation of the speed of these parts to regulate the rate of feeding. The moving parts may consist of rolls, screw conveyor arrangements, toothed wheels, etc., which abstract a constant and set volume of material from a reservoir or hopper and deliver it to the desired point. The actual quantity fed would depend upon the setting of the machine whereby the speed of the moving part would be controlled. Necessarily, the weight fed would be a function of the density of the material being fed, because of the volumetric nature of the machine. A second type of feeder under this category, gravimetric in nature, is the one in which the material being fed is actually weighed. Under electrical feeders would be included those which depend upon magnetic vibrations set up in the hopper and in the trough (or vibrating but stationary conveyor) to accomplish the movement of the material being fed. These feeders may be made open or enclosed depending upon the use to which they are put. However, in the present art of feeding and feeding systems, no simple and easy mechanism is known whereby hygroscopic and reactive materials may be fed without having a change in their physical or chemical properties take place during the feeding operation. This change may take place in the hopper, in the feeder conveyor, or in the feeding mechanism.

In general terms, the method I have devised consists in keeping the air in the hopper and in the trough, or any enclosed conveyor or discharge conduit, dry at all times. In the course of operation of presently available feeders which are recommended for hygroscopic or reactive powders because they have closed hoppers, the material in the hopper would be replaced with air from the surrounding atmosphere as the contents are depleted. This air would naturally contain as much moisture as the air might happen to hold. The air would pass over the stream of material being conveyed and then would enter the hopper. Its moisture would be imparted to the stream of material and eventually to the material contained in the hopper.

My invention avoids this. Stated in general terms, my invention consists in leaving the hopper exposed to the air through a tube filled with a drying agent such as activated alumina, silica gel, anhydrous calcium chloride, anhydrous calcium sulfate, or similar materials.

In addition, I provide means for introducing dry air into the apparatus between the hopper and the outlet of the discharge tube to prevent infiltration of moist air thereinto and eventual diffusion into the hopper. By my method, a positive flow of dry air is maintained outward from the apparatus into the receiving vessel, and finally out into the atmosphere.

The drawing shows a diagrammatic general assembly of apparatus embodying the invention.

A tightly covered hopper 1, feeding mechanism 2, and discharge or feeding tube 3, are combined with other apparatus or attachments in order to transform any feeder of a suitable type into a feeder for hygroscopic or reactive materials.

In the drawing, 4 represents a tube containing a drying agent B supported between glass wool plugs C, and 11 is a cylinder containing a supply of a dry gas D. The tube 4 is closed at both ends with suitable stoppers 5. A small extension 6, an open-end tube, allows air to be drawn into and through the tube 4, and a similar open-end tube 7 allows connection of the drying tube to a vent 8 that opens through the wall of the hopper. The tube 7 is connected with the vent 8 by means of tube 9. Cylinder 11 is attached to the feeding tube, or feeder discharge tube of a feeder at 10 by means of tubes 15 and 16 through a flowmeter 13 and gas flow regulating valve 12. Tube 14 connects the cylinder with the flowmeter.

In the tightly covered hopper 1, A represents a hygroscopic or reactive material which is to be fed by means of any suitable feeder mechanism 2 through the feeder discharge or feeding tube 3 into any desired receiver or vessel 17 containing material E with which A is to be mixed. For example, the feeder 2 might be used to supply a bleaching agent A contained in hopper 1 to flour E in vessel 17. Any means for accomplishing mixing of A with E may be provided in vessel 17 as for example an agitator.

The discharge tube or conduit 3 is provided with an inlet connection 10 to which tube 16 is attached for connecting the discharge tube with the cylinder 11 containing any suitable gas D, as for example dry compressed air, $CO_2$, nitrogen, etc.

By means of the drying tube 4 connected to the vent 8 by the rubber tubing 9, the contents of the hopper are protected from atmospheric moisture. No air can reach the contents except by way of tube 4. The air enters tube 4 through the open-end tube 6, and, passing over the drying agent B, is deprived of its moisture content.

The feeder 2 illustrated diagrammatically in the drawing includes a toothed or notched wheel 19 located in the hopper 1 above the discharge tube 3 and enclosed by the hopper from contact with the outside atmosphere. The wheel 19 fills the mouth of the hopper so that no material can escape from the hopper when the wheel is not turning, but as the wheel 19 is rotated in this enclosed space by a shaft 20, each notch in the wheel conveys a definite quantity of material from the hopper to the discharge tube 3 into which the material falls from the wheel by gravity. The amount of material fed from the hopper is regulated by controlling the number of revolutions of the notched wheel 19. Such feeders are well known and that illustrated is merely representative of feeders for supplying definite quantities of powdered or granular material from a hopper to a discharge tube, or outlet. On the feeder discharge tube the inlet connection 10 is preferably placed as close to the base of the hopper as possible. To this connection 10 is attached the cylinder 11, containing dry compressed air or any other suitable gas D, through a flow meter 13 by means of suitable connections, as rubber tubing 14, glass tubing 15, and rubber tubing 16.

The flowmeter 13 may be connected to the gas supply cylinder 11 as by a flexible tubing 14 of any length. The flow of gas is regulated as by a valve 12 and the amount supplied actually measured as by a flowmeter 13.

The description given above has been limited to one type of material, namely, a hygroscopic substance, in which the tendency of the material to absorb moisture would have precluded its handling in an ordinary feeder, but which in the presence of dry air or other dry gas could be fed continuously and accurately without difficulty. In place of a hygroscopic material, it might often be necessary to feed or dispense a material which has a tendency to react with oxygen. In that event, the only requirement would be an oxygen-free gas for the supply D and a blanket of the same gas in the reservoir of hopper 1. In this manner, contact of the reactive material with oxygen would be completely avoided.

The above descriptions apply to all commercial feeders which meet the requirements of a tightly closed hopper 1, an enclosed feeding mechanism 2, and an enclosed discharge tube 3. The hopper may be any vessel equipped with a tightly closed cover, cylindrical, pyramidal, or any other convenient shape, provided with an opening at the bottom to permit flow of its contents to the feeding mechanism 2. The hopper may be cylindrical or rectangular in shape. A given hopper could in general be used with any type of feeder, whether it be volumetric, gravimetric, or electrical.

In the above description both the drying tube 4 and dry gas supply cylinder 11 are utilized and it is advantageous that they be used at the same time. The drying tube can be used alone if the receiver E does not have an open top or it is not necessary to protect the material from moisture after it is discharged from the feeder 2. The dry gas supplied as a continuing current to the discharge tube 3 flows into the receiver E and then out into the atmosphere around the outside of the discharge tube 3 where that tube passes through the open mouth of the receiver 17, which mouth is substantially larger than the discharge tube. This current of dry air keeps moisture from entering the receiver and the feeding apparatus.

The pressure of the air stream through the inlet connection 10 is so little above atmospheric that it does not flow up into the hopper 1. If the powder A in the hopper is fine it offers more resistance to the passage of air from below than the pressure drop through the drying tube. The air or gas supply through the inlet connection 10 can be used without the vent 8 and drying tube 4, but such use results in lower pressures in the hopper above the material when feeding fine powder.

The above descriptions are intended to be general. The designated shapes and arrangement of parts are for the sake of illustration only, and have been used merely to assist in the description of my invention. Such description is not to be construed as limiting the scope of my invention, and all equivalent methods whereby the purpose of this invention may be accomplished, through the creation and maintenance of a conditioned atmosphere in the feeding system, are intended to fall within the scope of my invention.

Having thus broadly and in general terms described my invention, I claim the following:

1. Apparatus for feeding hygroscopic powders including in combination a tightly-closed hopper in which the powder is contained, a feeder at the bottom of the hopper, a conduit leading to an outlet to which the feeder delivers powder from the hopper, a vent through which air enters the tightly-closed hopper to replace the powder withdrawn by said feeder, a drying tube in series with said vent and through which air must pass to reach said hopper, and means for supplying a current of dry air into the apparatus at the conduit between the feeder and said outlet for discharge with the powder from said conduit.

2. Apparatus for feeding hygroscopic powders including in combination a tightly-closed hopper in which the powder is contained, a feeder at the bottom of the hopper, a conduit leading to an outlet to which the feeder delivers powder from the hopper, and means for supplying a current of dry air into the apparatus at the conduit between the feeder and said outlet and through the conduit in the same direction as the movement of the powder.

3. Apparatus for feeding a quantity of fine material and protecting the material from contact with the atmosphere, said apparatus comprising a tightly-closed hopper in which the material is contained, a feeder at the bottom of the hopper, a conduit leading to an outlet through which the material is discharged by the feeder and through which said material is supplied to a receiving vessel, a source of gas or gasese with which the material in the hopper is unreactive, and means for supplying gas or gases from said source to the hopper to form a blanket of said gas or gases above the material, and to the conduit at a region between the feeder and said outlet and through the conduit in the same direction as the movement of the powder.

4. The method of protecting a hygroscopic solid from moisture while feeding such solid in finely divided form from a hopper by means of a mechanical feeder that is located at the bottom of the hopper and that discharges into a conduit open at its lower end, which method comprises tightly closing the hopper and supplying air through a drying tube to the interior of the hopper to replace the solid that is withdrawn from the hopper, introducing a current of dry air into the conduit to make contact with the solid between the feeder and said outlet and causing the current of dry air to flow through the conduit in the direction of movement of the solid through said conduit.

5. In the feeding of finely divided material from a hopper by means of a mechanical feeder that discharges into a conduit, the method which comprises tightly closing the top of the hopper against entrance of air, introducing into contact with the material in the hopper and discharge conduit an atmosphere different from that outside the hopper and one with which the material in the hopper and discharge conduit does not react, and introducing the different atmosphere into the discharge conduit below the feeder as a continuous current that escape from the same end of the discharge conduit as the finely divided material.

6. Apparatus for supplying definite quantities of finely divided material including in combination a tightly-closed hopper in which the material is contained, a feeder at the bottom of the hopper, a discharge conduit through which material from the feeder is delivered, an open top receiver into which the discharge conduit extends, the opening at the top of the receiver being substantially larger than the discharge conduit, an air vent opening through a wall of the hopper near the upper end of the hopper, a drying tube connected in series with the air vent, a gas inlet opening into the discharge conduit below the feeder, a flow meter connected in series with said gas inlet, and means for connecting the flow meter with a compressed air cylinder or other source of air under pressure for causing a current of gas to flow through the discharge condiut into the receiver and out of the receiver through the open space around the discharge tube.

SOUREN Z. AVEDIKIAN.